US012386236B1

(12) United States Patent
Ihn et al.

(10) Patent No.: US 12,386,236 B1
(45) Date of Patent: Aug. 12, 2025

(54) MULTI-MODE PUMP LASER BASED MULTI-WAVELENGTH ENTANGLED PHOTON PAIR GENERATION DEVICE AND QUANTUM KEY DISTRIBUTION NETWORK CONFIGURATION METHOD USING THE SAME

(71) Applicant: AGENCY FOR DEFENSE DEVELOPMENT, Daejeon (KR)

(72) Inventors: Yong Sup Ihn, Daejeon (KR); Dongkyu Kim, Daejeon (KR); Kyungdeuk Park, Daejeon (KR); Dong Gil Im, Daejeon (KR); Yonggi Jo, Daejeon (KR); Nam Hun Park, Daejeon (KR); Dohoon Lim, Daejeon (KR); Jung Mo Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 19/220,807

(22) Filed: May 28, 2025

(30) Foreign Application Priority Data

May 31, 2024 (KR) .......................... 10-2024-0071834

(51) Int. Cl.
*G02F 1/35* (2006.01)

(52) U.S. Cl.
CPC .......... *G02F 1/3526* (2013.01); *G02F 1/3503* (2021.01); *G02F 1/3519* (2013.01); *G02F 2203/11* (2013.01)

(58) Field of Classification Search
CPC ..... G02F 1/3503; G02F 1/3519; G02F 1/3526
See application file for complete search history.

(56) References Cited

U.S. PATENT DOCUMENTS 9,134,422 B2    9/2015    Hunt et al.

FOREIGN PATENT DOCUMENTS

| JP | 5041256 B2 | 10/2012 |
| KR | 101960425 B1 | 3/2019 |
| KR | 20220077007 A | 6/2022 |
| KR | 102441594 B1 | 9/2022 |
| KR | 102453937 B1 | 10/2022 |

OTHER PUBLICATIONS

Notice of Allowance in Korean Application No. 10-2024-0071834 dated Nov. 28, 2024.

(Continued)

*Primary Examiner* — Rhonda S Peace
(74) *Attorney, Agent, or Firm* — Dilworth & Barrese, LLP.; Michael J. Musella, Esq.

(57) ABSTRACT

A multi-wavelength entangled photon pair generation device includes: a multi-mode pump laser that radiates a broadband pump laser beam in an ultraviolet wavelength range including multiple Gaussian-distributed wavelengths; a nonlinear crystal that generates a multi-wavelength de-multiplexed entangled photon pair in a near-infrared wavelength range including multiple wavelength components corresponding to multiple Gaussian-distributed wavelengths of the broadband pump laser beam, respectively; a temperature controller that adjusts a temperature of the nonlinear crystal; and an output optical system that filters out the broadband pump laser beam from light output through the nonlinear crystal and passes the multi-wavelength de-multiplexed entangled photon pair.

9 Claims, 14 Drawing Sheets

(56) References Cited

OTHER PUBLICATIONS

Morrison et al; Frequency-bin entanglement from domain engineered down-conversion, Jun. 1, 2022, APL Photon. 7, 066102.
Lee et al; Direct generation of frequency-bin entangled photons based on ppKTP crystals using a multiple longitudinal mode laser, Apr. 21, 2024, 2024 Annual Meeting of the Quantum Information Society of Korea, BPEX.
Korean Office Action in Korean Application No. 10-2024-0071834 dated Jul. 30, 2024.

MULTI-MODE PUMP LASER BASED MULTI-WAVELENGTH ENTANGLED PHOTON PAIR GENERATION DEVICE AND QUANTUM KEY DISTRIBUTION NETWORK CONFIGURATION METHOD USING THE SAME

CROSS-REFERENCE TO RELATED APPLICATION

This application claims priority to and the benefit of Korean Patent Application No. 10-2024-0071834 filed with the Korean Intellectual Property Office on May 31, 2025, the entire contents of which are incorporated herein by reference.

BACKGROUND

(a) Field

The present disclosure relates to a multi-mode pump laser based multi-wavelength entangled photon pair generation device and a quantum key distribution network configuration method using the same, and more specifically, to a multi-mode pump laser based multi-wavelength entangled photon pair generation device using a 0-type periodically poled potassium titanyl phosphate (periodically poled $KTiOPO_4$ (ppKTP)) crystal and a quantum key distribution network configuration method using the same.

(b) Description of the Related Art

Quantum entanglement is an important resource in quantum communication, and enables implementation of classically impossible entanglement-based quantum communication such as quantum key distribution (QKD), quantum transportation, or quantum secrete sharing. In particular, in the case of a quantum key distribution network, many studies are being conducted on an entanglement-based wavelength de-multiplexing quantum key distribution network as an essential technology for multi-party quantum communication.

From such a perspective, a high-efficiency quantum light source with sufficient brightness and entanglement visibility based on a nonlinear crystal with a second-order nonlinear coefficient has been continuously studied and developed, and in particular, studies have been conducted on an entanglement-based wavelength de-multiplexing quantum communication network by splitting an entanglement light source of a wide bandwidth in a communication wavelength range of 1550 nm using a wavelength de-multiplexing (WDM) filter based on a periodically-poled lithium niobate (ppLN) crystal to create multiple entangled photon pairs.

However, there is a problem that the wavelength de-multiplexing quantum communication network becomes complicated due to the use of the wavelength de-multiplexing filter.

SUMMARY

The present disclosure attempts to provide a multi-mode pump laser based multi-wavelength entangled photon pair generation device capable of generating photon pairs subjected to multi-wavelength de-multiplexing without a wavelength de-multiplexing filter by using a 0-type ppKTP crystal having a high second-order nonlinear coefficient value, and a quantum key distribution network configuration method using the same.

A multi-wavelength entangled photon pair generation device according to an embodiment of the present disclosure includes: a multi-mode pump laser that radiates a broadband pump laser beam in an ultraviolet wavelength range including multiple Gaussian-distributed wavelengths; a nonlinear crystal that generates a multi-wavelength de-multiplexed entangled photon pair in a near-infrared wavelength range including multiple wavelength components corresponding to multiple Gaussian-distributed wavelengths of the broadband pump laser beam, respectively; a temperature controller that adjusts a temperature of the nonlinear crystal; and an output optical system that filters out the broadband pump laser beam from light output through the nonlinear crystal and passes the multi-wavelength de-multiplexed entangled photon pair.

The nonlinear crystal may be a 0-type periodically poled potassium titanyl phosphate (periodically poled $KTiOPO_4$ (ppKTP)) crystal having a periodic poling structure.

The multi-wavelength entangled photon pair generation device may further include an input optical system that sets a polarization direction of the broadband pump laser beam incident on the nonlinear crystal to be aligned with an optical axis direction of the nonlinear crystal.

The input optical system may include a quarter-wave plate, a first half-wave plate, an input polarization beam splitter, and a second half-wave plate arranged such that the broadband pump laser beam sequentially passes therethrough.

The multi-wavelength entangled photon pair generation device may further include: a first lens that focuses the broadband pump laser beam at the center of the nonlinear crystal; and a second lens that adjusts a beam width such that the multi-wavelength de-multiplexed entangled photon pair generated by the broadband pump laser beam focused at the center of the nonlinear crystal by the first lens does not spread out and travels as a straight beam to make the multi-wavelength de-multiplexed entangled photon pair be incident on the output optical system.

A Rayleigh length of the first lens may be set to be larger than a length of the nonlinear crystal.

The output optical system may include a first dichroic mirror and a second dichroic mirror arranged such that light output through the nonlinear crystal sequentially passes therethrough, and the first dichroic mirror and the second dichroic mirror may reflect light in an ultraviolet range and transmit light in a near-infrared range.

A multi-wavelength entangled photon pair generation device according to another embodiment of the present disclosure includes: a multi-mode pump laser that radiates a broadband pump laser beam in an ultraviolet wavelength range including multiple Gaussian-distributed wavelengths; a nonlinear crystal that generates a multi-wavelength de-multiplexed entangled photon pair in a near-infrared wavelength range including multiple wavelength components corresponding to multiple Gaussian-distributed wavelengths of the broadband pump laser beam, respectively; a temperature controller that adjusts a temperature of the nonlinear crystal; and a Sagnac interferometer that separates the broadband pump laser beam into two paths such that beams of the two paths are incident on both sides of the nonlinear crystal while facing each other to generate the multi-wavelength de-multiplexed entangled photon pair traveling to both sides of the nonlinear crystal.

The Sagnac interferometer may include: an interferometer polarization beam splitter that splits the broadband pump laser beam into two paths at a ratio of 50:50; a first double-coated mirror and a second double-coated mirror disposed so as to reflect beams of the two paths such that the beams of the two paths separated by the interferometer polarization beam splitter travel in opposite directions and face each other; and an interferometer half-wave plate positioned between the interferometer polarization beam splitter and the first double-coated mirror.

The nonlinear crystal may be positioned between the first double-coated mirror and the second double-coated mirror at a portion where the beams of the two paths face each other in opposite directions.

The first double-coated mirror and the second double-coated mirror may include a first coating reflecting light in an ultraviolet range and a second coating reflecting light in a near-infrared range to reflect light in both of the ultraviolet range and the near-infrared range.

The multi-wavelength de-multiplexed entangled photon pair traveling to both sides of the nonlinear crystal may be respectively reflected by the first double-coated mirror and the second double-coated mirror, and then combined by the interferometer polarization beam splitter to travel.

The multi-wavelength entangled photon pair generation device may further include: a first lens that focuses the beams of the two paths at the center of the nonlinear crystal positioned in the Sagnac interferometer; and a second lens that adjusts a beam width such that the multi-wavelength de-multiplexed entangled photon pair traveling after being combined by the interferometer polarization beam splitter does not spread out and travels as a straight beam.

The multi-wavelength entangled photon pair generation device may further include: a first dichroic mirror that reflects the broadband pump laser beam passing through the first lens to the Sagnac interferometer; and a second dichroic mirror that transmits the multi-wavelength de-multiplexed entangled photon pair passing through the second lens and reflects light in the ultraviolet range.

The multi-wavelength entangled photon pair generation device may further include a third dichroic mirror that is configured to split the multi-wavelength de-multiplexed entangled photon pair transmitted through the second dichroic mirror into a signal and an idler.

A quantum key distribution network configuration method using a multi-wavelength entangled photon pair generation device according to another embodiment of the present disclosure includes: irradiating, by the multi-wavelength entangled photon pair generation device, a nonlinear crystal with a broadband pump laser beam in an ultraviolet wavelength range including multiple Gaussian-distributed wavelengths to generate a multi-wavelength de-multiplexed polarization-entangled photon pair in a near-infrared wavelength range including multiple wavelength components corresponding to the multiple Gaussian-distributed wavelengths of the broadband pump laser beam, respectively; splitting, by the multi-wavelength entangled photon pair generation device, the multi-wavelength de-multiplexed polarization-entangled photon pair for each wavelength into a plurality of channels; and multiplexing, by the multi-wavelength entangled photon pair generation device, channels to be distributed to a plurality of users.

The multi-wavelength entangled photon pair generation device may change a temperature of the nonlinear crystal to generate the multi-wavelength de-multiplexed polarization-entangled photon pair in the near-infrared wavelength range that satisfies a temperature-specific phase matching condition for each of multiple wavelength components of the broadband pump laser beam.

The multi-mode pump laser based multi-wavelength entangled photon pair generation device according to the embodiment of the present disclosure may generate photon pairs subjected to multi-wavelength de-multiplexing without a wavelength de-multiplexing filter by using 0-type ppKTP crystal having a high second-order nonlinear coefficient value, and a quantum key distribution network that performs multi-party quantum key distribution may be configured using the multi-mode pump laser based multi-wavelength entangled photon pair generation device.

DETAILED DESCRIPTION

Figure 1:
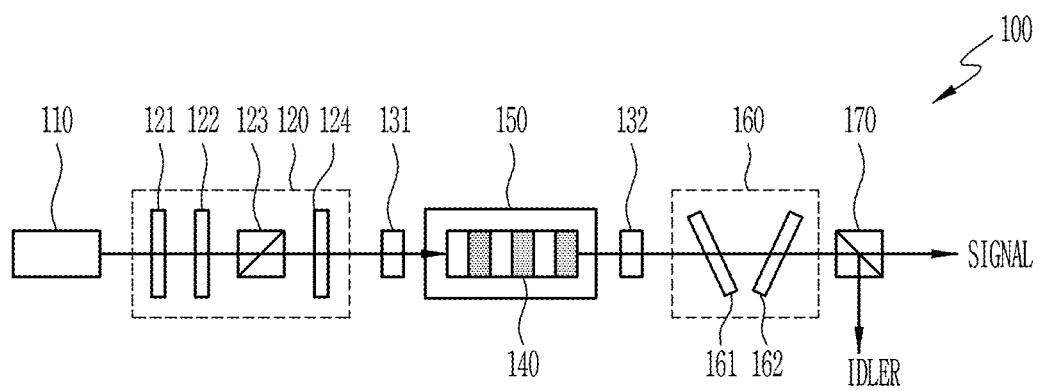
FIG. 1 is a block diagram illustrating a multi-mode pump laser based multi-wavelength entangled photon pair generation device according to an embodiment of the present disclosure.

Hereinafter, embodiments of the present disclosure will be described in detail with reference to the accompanying drawings so that those skilled in the art to which the present disclosure pertains may easily practice the present disclosure. However, the present disclosure may be implemented in various different forms and is not limited to embodiments provided herein.

Portions unrelated to the description will be omitted in order to obviously describe the present disclosure, and the same or similar components will be denoted by the same reference numerals throughout the present specification.

In addition, throughout the present specification, unless explicitly described to the contrary, the word "comprise" and variations such as "comprises" or "comprising", will be understood to imply the inclusion of stated elements but not the exclusion of any other elements.

Hereinafter, a multi-mode pump laser based multi-wavelength entangled photon pair generation device according to an embodiment of the present disclosure will be described with reference to FIGS. 1 to 11. Further, a multi-mode pump laser based multi-wavelength entangled photon pair generation device according to another embodiment of the present disclosure will be described with reference to FIG. 12. In addition, a quantum key distribution network using a multi-mode pump laser based multi-wavelength entangled photon pair generation device according to the embodiment of the present disclosure will be described with reference to FIGS. 13 and 14.

The multi-mode pump laser based multi-wavelength entangled photon pair generation device according to the embodiment of the present disclosure may generate entangled photon pairs of de-multiplexed wavelengths without filtering using a wavelength de-multiplexing (WDM) filter by irradiating a nonlinear crystal with a broadband pump laser beam having multiple frequency modes. The nonlinear crystal may be a 0-type periodically poled potassium titanyl phosphate (periodically poled KTiOPO$_4$ (ppKTP)) crystal. The multi-mode pump laser based multi-wavelength entangled photon pair generation device may create a multidimensional entangled state or a hyper-entangled quantum state, and may apply the multidimensional entangled state or the hyper-entangled quantum state to implement the quantum key distribution network.

FIG. 1 is a block diagram illustrating the multi-mode pump laser based multi-wavelength entangled photon pair generation device according to the embodiment of the present disclosure.

Referring to FIG. 1, a multi-mode pump laser based multi-wavelength entangled photon pair generation device 100 according to an embodiment of the present disclosure may include a multi-mode pump laser 110, an input optical system 120, a first lens 131, a second lens 132, a nonlinear crystal 140, a temperature controller 150, an output optical system 160, and an output polarization beam splitter 170.

The multi-mode pump laser 110 may radiate the broadband pump laser beam in an ultraviolet wavelength range toward the input optical system 120. The broadband pump laser beam may have multiple frequency modes and may include multiple Gaussian-distributed wavelength components. The broadband pump laser beam may include multiple wavelength components in an ultraviolet range around 405 nm. The multi-mode pump laser 110 may include an ultraviolet laser diode having a wide bandwidth including multiple wavelength components.

Figure 2:
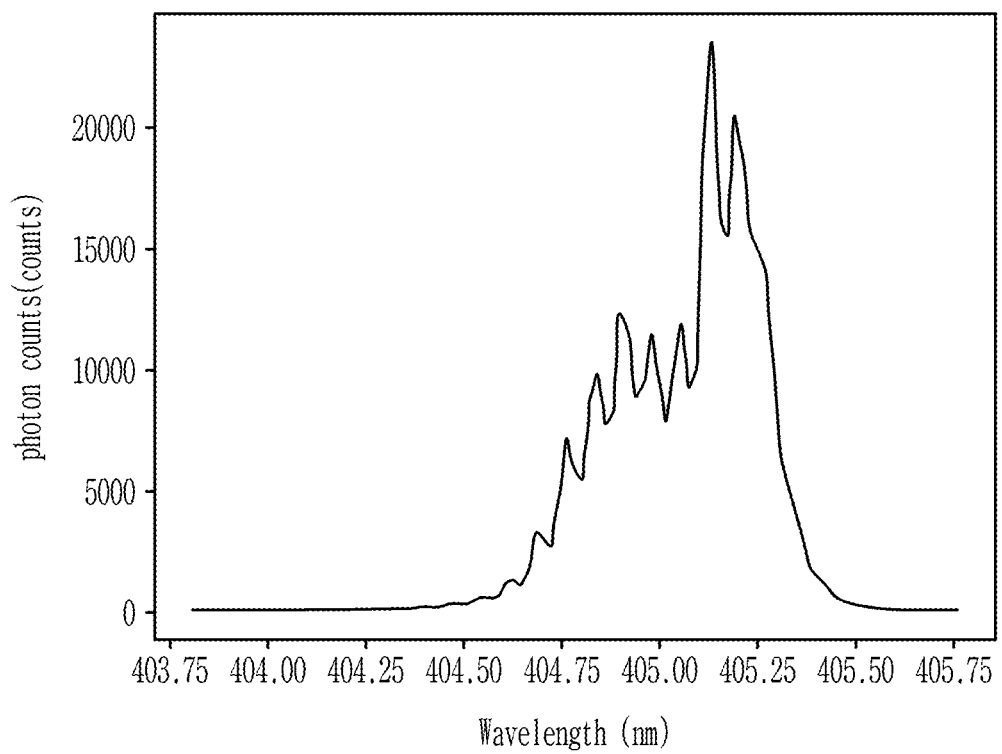
FIG. 2 illustrates a spectrum of a broadband pump laser beam of a multi-mode pump laser according to an embodiment of the present disclosure.
Figure 3:
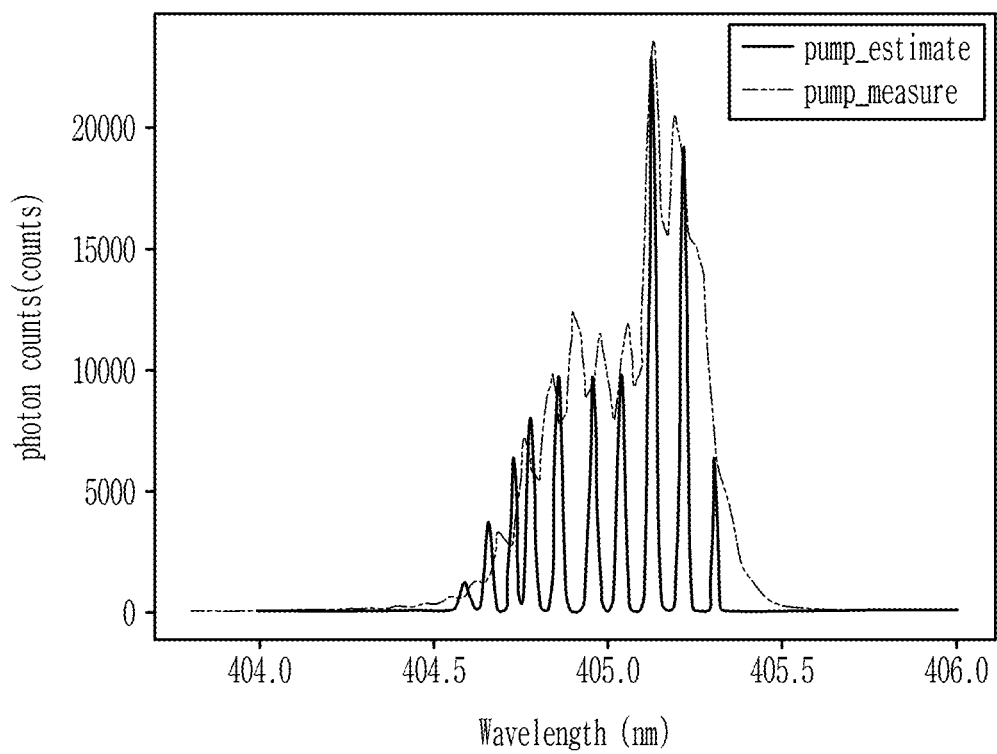
FIG. 3 illustrates a spectrum of the broadband pump laser beam formed by the sum of Gaussian functions having multiple central wavelengths.

FIG. 2 illustrates a spectrum of the broadband pump laser beam of the multi-mode pump laser according to the embodiment of the present disclosure. FIG. 3 illustrates a spectrum of the broadband pump laser beam formed by the sum of Gaussian functions having multiple central wavelengths.

Referring to FIGS. 2 and 3, an ultraviolet laser diode (L405P20) of Thorlabs, Inc. is used as the multi-mode pump laser 110, and an electron-multiplying charge-coupled device (CCD) camera (EMCCD camera) is used to measure the spectrum of the broadband pump laser beam radiated from the ultraviolet laser diode.

Here, it may be seen that multiple major wavelength components overlap each other to form the spectrum. Such an entire spectrum of the beam may be expressed as the sum of the Gaussian functions $$\mu(\lambda_n) = h_n e^{-\frac{(\lambda_n - \lambda_{p0,n})^2}{2\sigma_n^2}}$$

each having a central wavelength $\lambda_{p0,n}$, in which $\lambda_{p0,n}$ represents the n-th central wavelength, and $h_n$ and $\sigma_n$ represent an amplitude and a dispersion value of the Gaussian function, respectively.

As illustrated in FIG. 3, the spectrum of the broadband pump laser beam may be formed by the sum $$\sum_{n=1}^{i} \mu(\lambda_n) = \sum_{n=1}^{i} h_n e^{-\frac{(\lambda_{pn} - \lambda_{p0,n})^2}{2\sigma_n^2}}$$

of the Gaussian functions having multiple central wavelengths $\lambda_{p0,n}$.

Referring back to FIG. 1, the input optical system 120 may set a polarization direction of the broadband pump laser beam radiated from the multi-mode pump laser 110 and incident on the nonlinear crystal 140 to be aligned with an optical axis direction (for example, a vertical direction) of the nonlinear crystal 140 for photon pair generation. To this end, the input optical system 120 may include a quarter-wave plate (QWP) 121, a first half-wave plate (HWP) 122, an input polarization beam splitter 123, and a second half-wave plate 124 arranged such that the broadband pump laser beam sequentially passes therethrough. The broadband pump laser beam is generated as linearly polarized light while sequentially passing through the quarter-wave plate 121, the first half-wave plate 122, and the input polarization beam splitter 123, and a polarization direction of the linearly polarized light may be aligned with the optical axis direction of the nonlinear crystal 140 while the linearly polarized light passes through the second half-wave plate 124. An intensity of the beam passing through the input optical system 120 and incident on the nonlinear crystal 140 may be adjusted by the quarter-wave plate 121, the first half-wave plate 122, and the input polarization beam splitter 123.

The first lens 131 may focus the broadband pump laser beam whose polarization direction is aligned with the optical axis direction of the nonlinear crystal 140 by the input optical system 120 on the center of the nonlinear crystal 140. A Rayleigh length of the first lens 131 may be set to be larger than a length of the nonlinear crystal 140 for efficient photon pair generation.

The nonlinear crystal 140 may be a 0-type ppKTP crystal having a periodic poling structure. When the broadband pump laser beam is incident on the nonlinear crystal 140, spontaneous parametric down conversion (SPDC) may occur to generate the photon pair. The nonlinear crystal 140 may generate a multi-wavelength de-multiplexed entangled photon pair in a near-infrared wavelength range including multiple wavelength components corresponding to multiple Gaussian-distributed wavelengths of the broadband pump laser beam, respectively. The multi-wavelength de-multiplexed entangled photon pair may include multiple wavelength components (multiple Gaussian-distributed wavelengths) in a near-infrared range around 810 nm.

The temperature controller 150 may control a temperature of the nonlinear crystal 140. As the temperature controller 150 changes the temperature of the nonlinear crystal 140, the multi-wavelength de-multiplexed entangled photon pair in the near-infrared wavelength range that satisfies a temperature-specific phase matching condition for each of multiple wavelength components of the broadband pump laser beam may be generated. Here, a desired multi-wavelength de-multiplexed entangled photon pairs in the near-infrared wavelength range may be generated in various regions by using various poling periods and the broadband pump laser beam that satisfies the condition.

The second lens 132 may make the multi-wavelength de-multiplexed entangled photon pair be incident on the output optical system 160 by adjusting a beam width such that the multi-wavelength de-multiplexed entangled photon pair generated by focusing the broadband pump laser beam on the center of the nonlinear crystal 140 by the first lens 131 does not spread out and may proceed as a straight beam.

The output optical system 160 may filter out the broadband pump laser beam in the ultraviolet wavelength range from light output through the nonlinear crystal 140 and pass the multi-wavelength de-multiplexed entangled photon pair in the near-infrared wavelength range. To this end, the output optical system 160 may include a first dichroic mirror 161 and a second dichroic mirror 162 arranged such that the light output through the nonlinear crystal 140 sequentially passes therethrough. The first dichroic mirror 161 and the second dichroic mirror 162 may reflect light in an ultraviolet range of 405 nm and transmit light in a near-infrared range of 810 nm. The light output through the nonlinear crystal 140 sequentially passes through the second lens 132, the first dichroic mirror 161, and the second dichroic mirror 162, so that the broadband pump laser beam in the ultraviolet wavelength range may be removed, and the multi-wavelength de-multiplexed entangled photon pair in the near-infrared wavelength range may be incident on the output polarization beam splitter 170.

The output polarization beam splitter 170 may split the multi-wavelength de-multiplexed entangled photon pair into a signal and an idler.

Meanwhile, the entangled photon pair is generated through nonlinear interaction of the broadband pump laser beam and the 0-type ppKTP crystal having the periodic poling structure, and is generated so as to satisfy a quasi-phase matching condition of Equation 1.

$$\Delta \tilde{k} = -k_p(\lambda_p) + k_i\left(\frac{\lambda_s \lambda_p}{\lambda_s - \lambda_p}\right) + k_s(\lambda_s) + \frac{2\pi m}{\Lambda}. \quad \text{(Equation 1)}$$

$$\omega_p = \omega_s + \omega_i \rightarrow \frac{1}{\lambda_p} = \frac{1}{\lambda_s} + \frac{1}{\lambda_i}$$

Here, represents a frequency of the broadband pump laser beam, $\omega_s$ represents a frequency of the signal, $\omega_i$ represents a frequency of the idler, $\lambda_p$ represents a wavelength of the broadband pump laser beam, $\lambda_o$ represents a wavelength of the signal, and $\lambda_i$ represents a wavelength of the idler. A wavenumber $k_l$ may be expressed as a wavelength and a refractive index of light, and l=p,s,i in which p represents a pump, s represents the signal, and i represents the idler. $\Lambda$ is the poling period of the 0-type ppKTP crystal. m is a matching order, and since there is no contribution of a sync function that achieves phase matching for m other than m that ensures matching under the phase matching condition, only one m value remains as a result.

Figure 4:
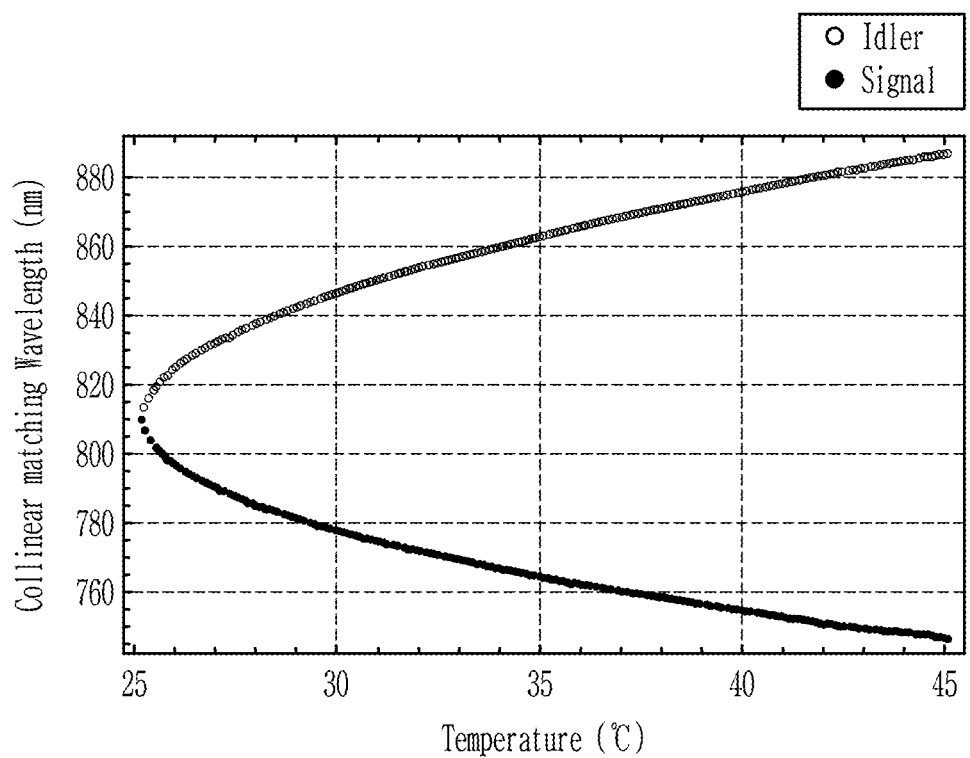
FIG. 4 illustrates an example of a phase matching wavelength condition according to a temperature in a case where a pump laser beam having a single wavelength is used.

FIG. 4 illustrates an example of a phase matching wavelength condition according to a temperature in a case where the pump laser beam having a single wavelength is used.

Referring to FIG. 4, in a case where the pump laser beam having a single frequency or single wavelength with a very narrow bandwidth is incident on the 0-type ppKTP crystal, the phase matching wavelength condition according to a single temperature may be obtained as exemplified.

However, in a case where the broadband pump laser beam having multiple wavelength distributions is used as in the embodiment of the present disclosure, multiple phase matching wavelength conditions according to the wavelength components are established.

Figure 5:
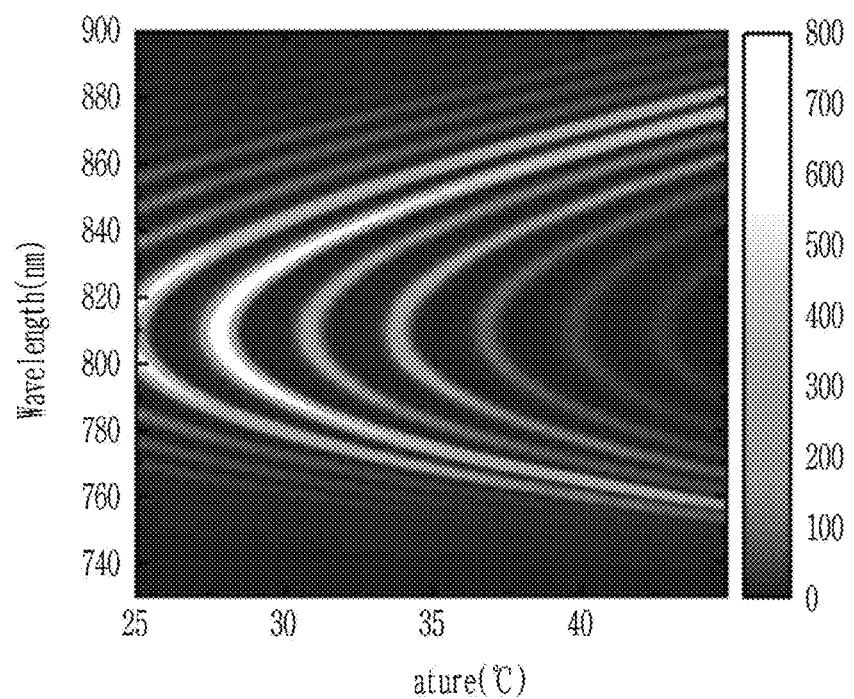
FIG. 5 illustrates an example of a phase matching wavelength condition according to a temperature of photon pairs generated using the broadband pump laser beam.
Figure 6:
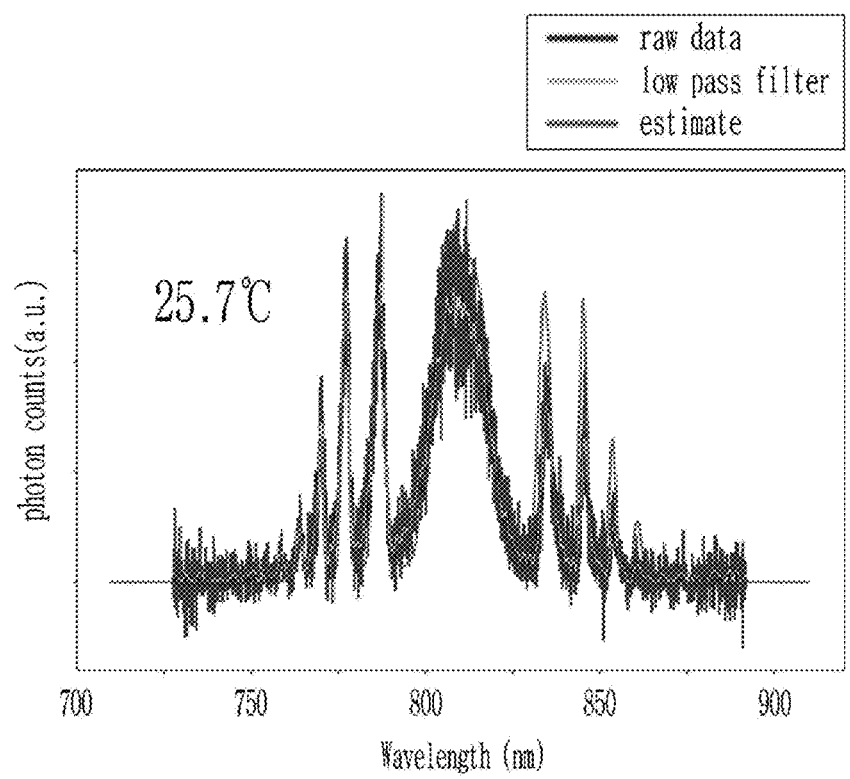
FIGS. 6 to 11 illustrate photon-pair spectra and theoretical curves generated from 0-type periodically poled potassium titanyl phosphate (periodically poled KTiOPO$_4$ (ppKTP)) crystals having different temperatures using the multi-mode pump laser.
Figure 7:
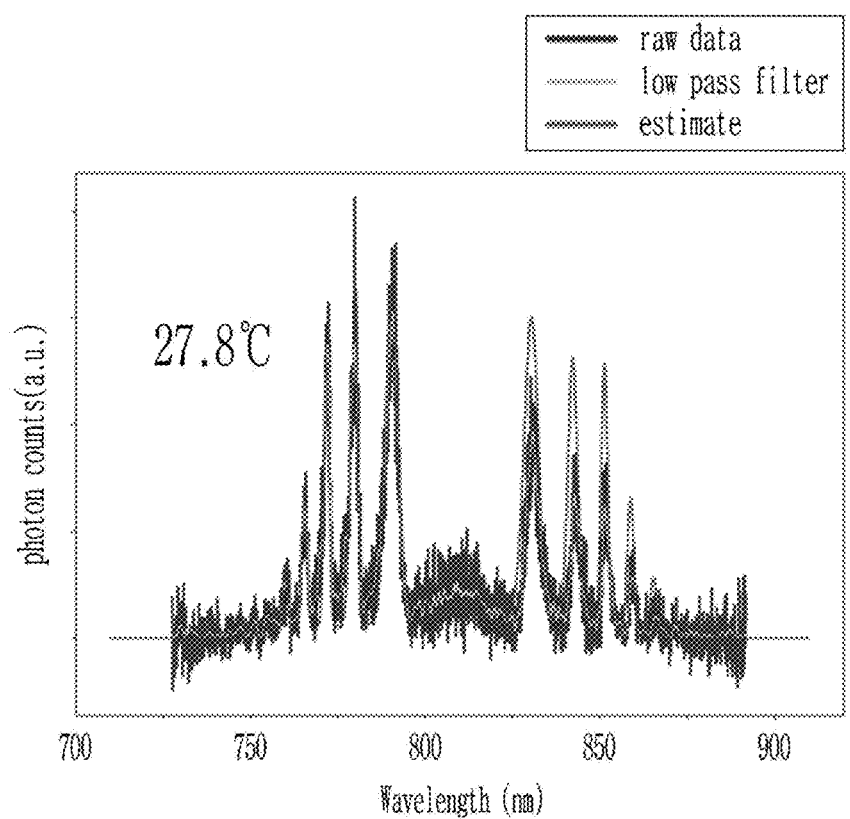
Figure 8:
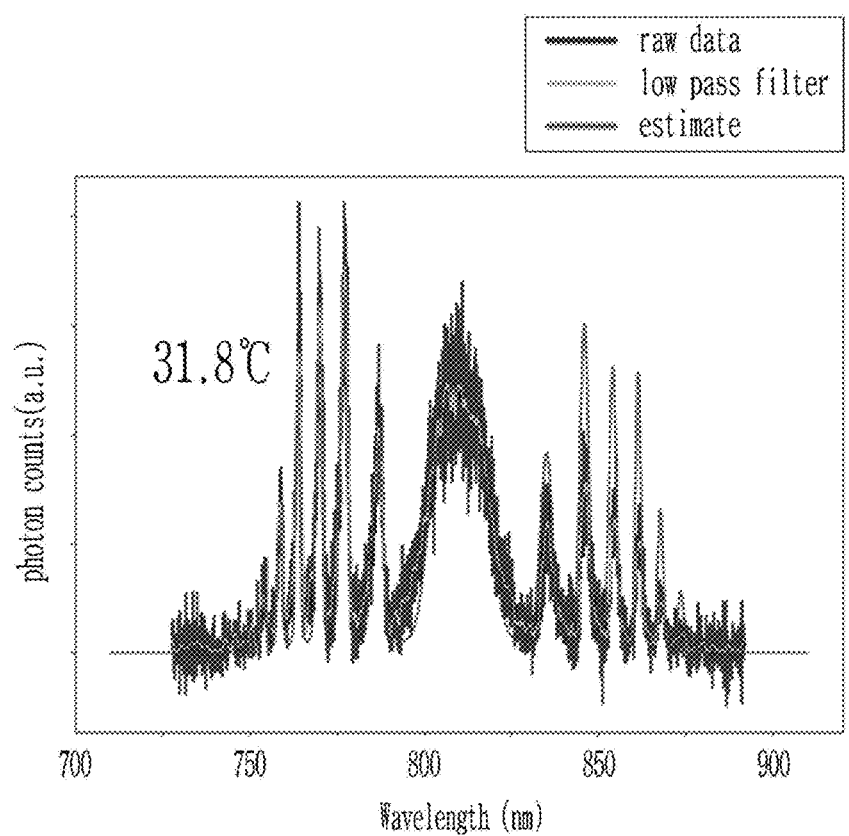
Figure 9:
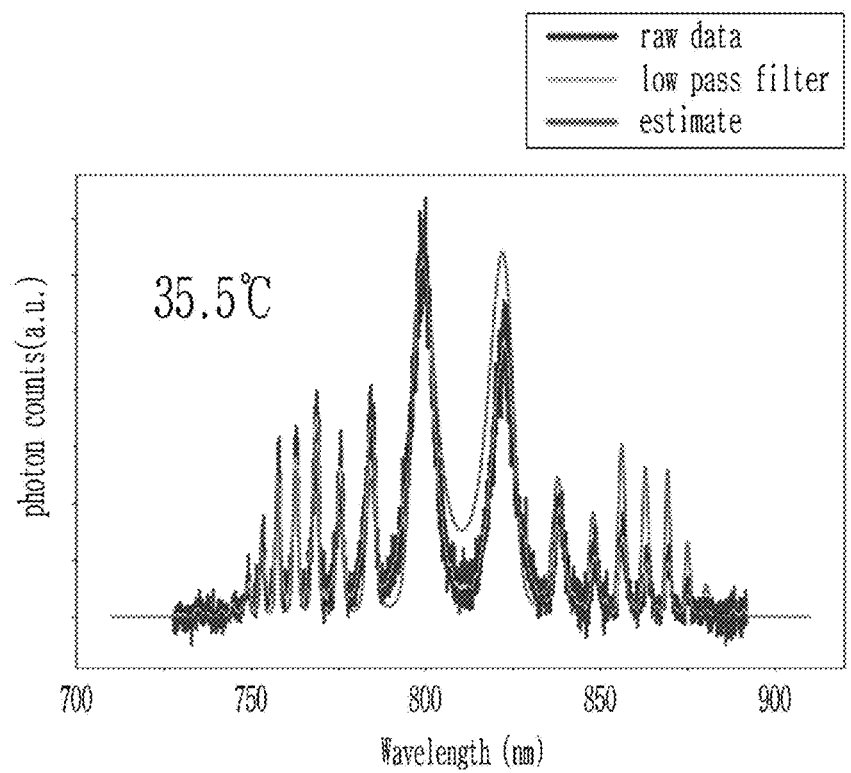
Figure 10:
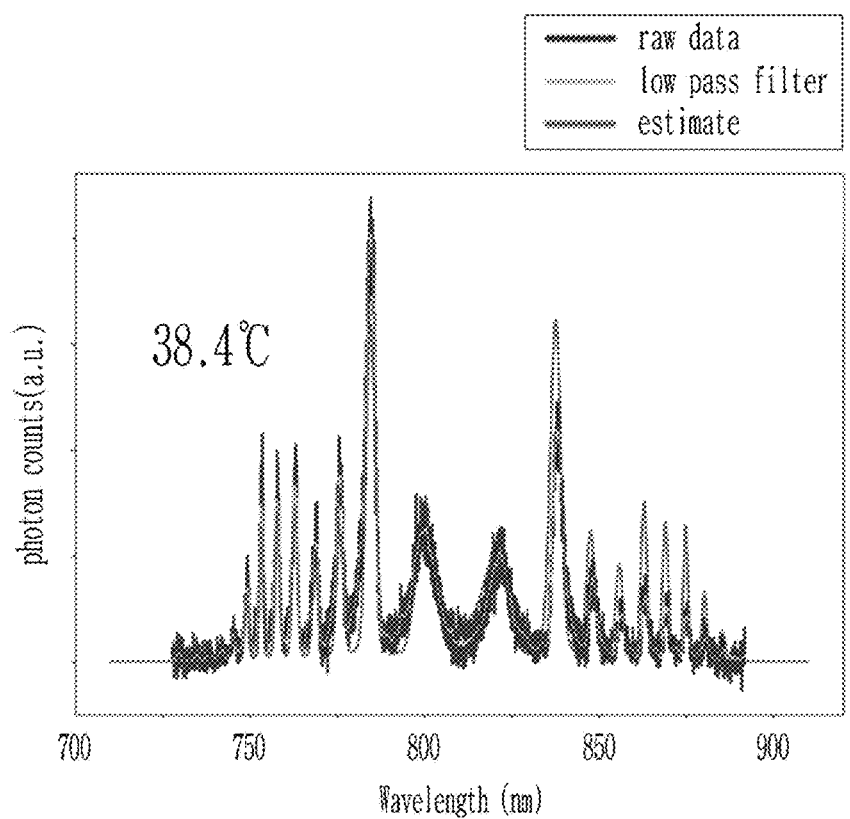
Figure 11:
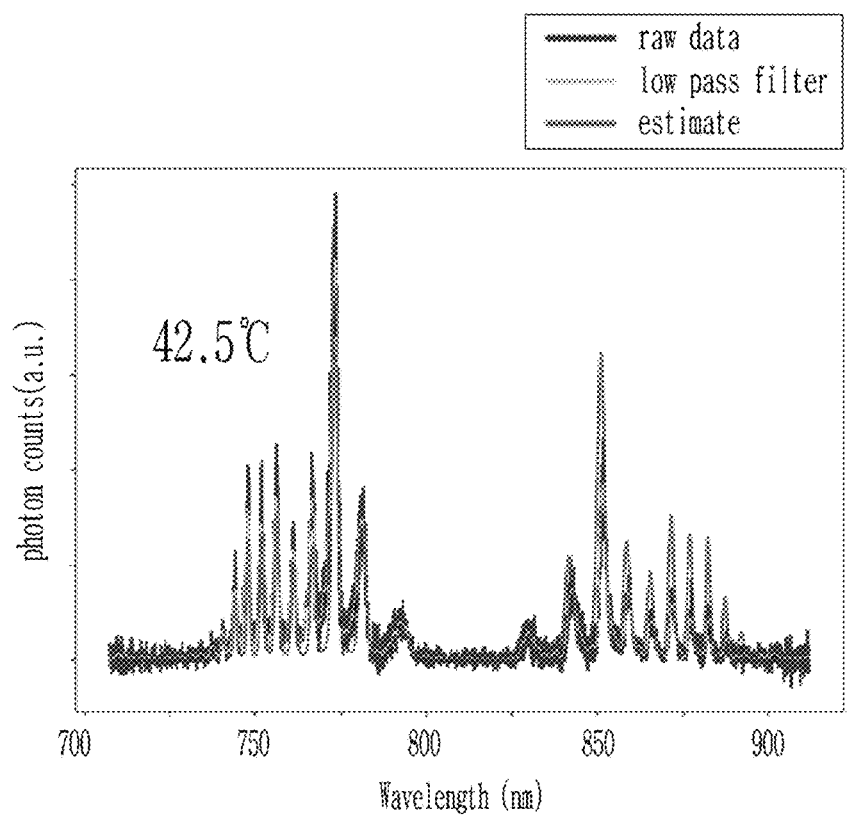

FIG. 5 illustrates an example of the phase matching wavelength condition according to a temperature of the photon pairs generated using the broadband pump laser beam.

FIG. 5 illustrates a result obtained by measuring the phase matching wavelength condition according to the temperature of the photon pair of the signal and the idler generated when pumping the 0-type ppKTP crystal with the broadband pump laser beam.

From an interaction Hamiltonian for the phase matching condition, a wave function of the spontaneous parametric down conversion (SPDC) may be obtained, which may be given as in Equation 2.

$$\hat{H}_I(t) = \epsilon_0 \int_V \chi^{(2)} \hat{E}_p^{(+)}(\vec{r},t) \hat{E}_s^{(-)}(\vec{r},t) \hat{E}_i^{(-)}(\vec{r},t) d^3r + H.C. \, | \psi \rangle = \quad \text{(Equation 2)}$$

$$e^{-\frac{i}{\hbar} \int_{-\infty}^{\infty} \hat{H}_I dt} | 0 \rangle$$

Here, $\epsilon_0$ represents a vacuum permittivity, and $\chi^{(2)}$ represents a second-order nonlinear coefficient. $E_p$ represents an electric field operator of the broadband pump laser beam, $E_0$ represents an electric field operator of the signal, and $E_i$ represents an electric field operator of the idler. H.C. represents a Hermitian conjugate operator, and a detailed equation related to the electric field operator is omitted here.

One of important physical quantities that represents a property of the photon pair generated through the SPDC process is a joint spectrum intensity (JPI), and the JPI may be obtained as the square of a photon pair wave function. For convenience, in a wavelength domain, the wave function may be expressed as in Equation 3.

$$|\psi\rangle = Q \int\int d\lambda_s d\lambda_i \mu(\lambda_p) \text{sinc}\left(\frac{\Delta \tilde{k}(\lambda_s, \lambda_i)L}{2}\right) \hat{a}_s^\dagger(\lambda_s) \hat{a}_i^\dagger(\lambda_i) | 0 \rangle \quad \text{(Equation 3)}$$

Here, a function $$f(\lambda_s, \lambda_i) = \mu(\lambda_p) \text{sinc}\left(\frac{\Delta \tilde{k}(\lambda_s, \lambda_i)L}{2}\right)$$

representing a size of the wavelength domain is defined as a joint spectrum amplitude (JSA), and the square of the JSA is JSI, which may be expressed as in Equation 4.

$$JSI = |f(\lambda_s, \lambda_i)|^2 = \left|\mu(\lambda_p) \text{sinc}\left(\frac{\Delta \tilde{k}(\lambda_s, \lambda_i)L}{2}\right)\right|^2 \quad \text{(Equation 4)}$$

The photon pair generated through the SPDC is sometimes desired to have strong correlation depending on an intended use, and is sometimes desired to have as little correlation as possible. For example, in a case where a strongly entangled photon pair is to be obtained, the correlation between the photon pair needs to be large. On the other hand, in a case where a single photon source is to be created, the photon pair needs to have as little correlation as possible. This may be confirmed through the JSA or the JSI. In a case where the JSI may be separated into the functions of $\lambda_s$ and $\lambda_i$, respectively, the wave function |ψ> may be separated into the wave functions of the signal and the idler, respectively. This is usually called wave function factorization. In a case where the signal and idler photons are strongly entangled, the wave function factorization is impossible.

Here, when using the broadband pump laser beam according to the embodiment of the present disclosure, a spectrum $S(\lambda_s, \lambda_i)$ of the generated photon pair may be expressed as the sum of multiple Gaussian-distributed wavelengths as in Equation 5.

(Equation 5)
$$S(\lambda_s, \lambda_i) = A \int_{in}^{max} \left| \sum_{n=1}^{j} h_n \exp\left(\frac{-(\lambda_p - \lambda_{p0,n})^2}{2\sigma_n^2}\right) \sin c\left(\frac{\left(k(\lambda_s) + k(\lambda_i) - k(\lambda_p) + \frac{2\pi}{\Lambda}\right)L}{2}\right) \right|^2 d\lambda_p$$

Here, i represents the total number of Gaussian-distributed wavelength components of the broadband pump laser beam, $h_n$ represents an amplitude of the Gaussian-distributed components of the n-th pump, $\lambda_{p0,n}$ represents an average (or central wavelength) of the Gaussian-distributed components of the n-th pump, and $\sigma_n^2$ represents a variance of the Gaussian-distributed components of the n-th pump.

FIGS. 6 to 11 illustrate photon-pair spectra and theoretical curves generated from the 0-type ppKTP crystals having different temperatures using the multi-mode pump laser.

FIGS. 6 to 11 illustrate actual spectra measured when the 0-type ppKTP crystals having different temperatures (25.7° C., 27.8° C., 31.8° C., 35.5° C., 38.4° C., and 42.5° C.) are irradiated with the broadband pump laser beam exemplified in FIG. 2, and theoretical curves obtained using Equation 5. It may be seen that various (different) types of multi-wavelength de-multiplexed entangled photon pairs may be generated in the near-infrared wavelength range depending on the temperature of the 0-type ppKTP crystal.

Figure 12:
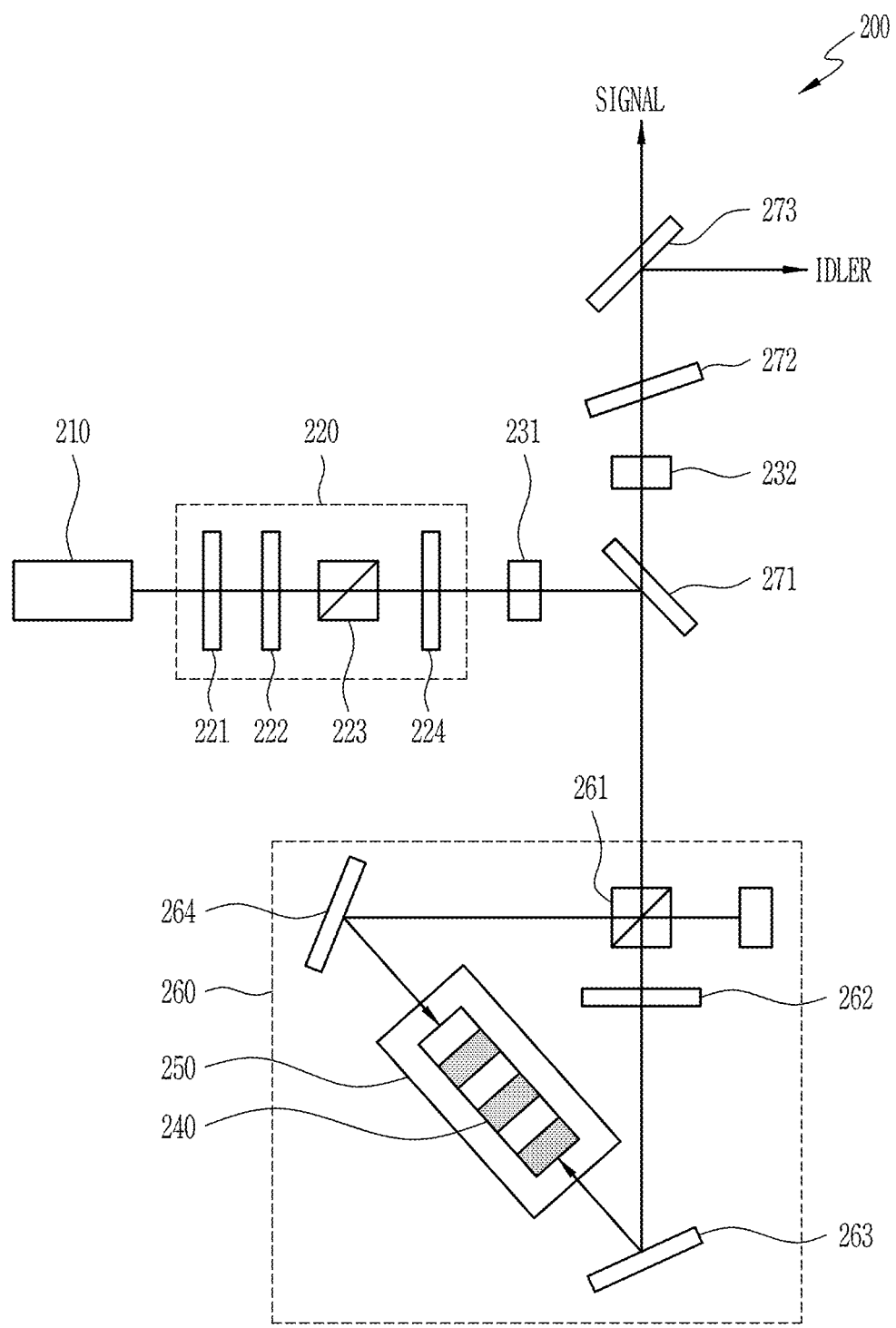
FIG. 12 is a block diagram illustrating a multi-mode pump laser based multi-wavelength entangled photon pair generation device according to another embodiment of the present disclosure.

FIG. 12 is a block diagram illustrating the multi-mode pump laser based multi-wavelength entangled photon pair generation device according to another embodiment of the present disclosure.

Referring to FIG. 12, a multi-mode pump laser based multi-wavelength entangled photon pair generation device 200 according to another embodiment of the present disclosure may include a multi-mode pump laser 210, an input optical system 220, a first lens 231, a second lens 232, a nonlinear crystal 240, a temperature controller 250, a Sagnac interferometer 260, a first dichroic mirror 271, a second dichroic mirror 272, and a third dichroic mirror 273.

Structural characteristics of the multi-mode pump laser 210, the input optical system 220, the first lens 231, the second lens 232, the nonlinear crystal 240, and the temperature controller 250 are substantially the same as structural characteristics of the multi-mode pump laser 110, the input optical system 120, the first lens 131, the second lens 132, the nonlinear crystal 140, and the temperature controller 150 described above in the embodiment of FIG. 1. In addition, structural characteristics of a quarter-wave plate 221, a first half-wave plate 222, an input polarization beam splitter 223, and a second half-wave plate 224 included in the input optical system 220 are substantially the same as structural characteristics of the quarter-wave plate 121, the first half-wave plate 122, the input polarization beam splitter 123, and the second half-wave plate 124 described above in the embodiment of FIG. 1. A repetitive description of substantially the same configuration characteristics is omitted.

The first dichroic mirror 271 may reflect a broadband pump laser beam passing through the first lens 231 to the Sagnac interferometer 260. The first dichroic mirror 271 may be configured to reflect a shorter wavelength (an ultraviolet range around 405 nm) and transmit a long wavelength (a near-infrared range around 810 nm). That is, the first dichroic mirror 271 may reflect the broadband pump laser beam in the ultraviolet range around 405 nm and transmit a multi-wavelength de-multiplexed entangled photon pair in the near-infrared band around 810 nm.

The Sagnac interferometer 260 may separate the broadband pump laser beam into two paths such that beams of the two paths are incident on both sides of the nonlinear crystal 240 while facing each other to generate a multi-wavelength de-multiplexed entangled photon pair traveling in opposite directions. To this end, the Sagnac interferometer 260 may include an interferometer polarization beam splitter 261, an interferometer half-wave plate 262, a first double-coated mirror 263, and a second double-coated mirror 264. The interferometer polarization beam splitter 261 may split the incident broadband pump laser beam reflected by the first dichroic mirror 271 into two paths at a ratio of 50:50. The first double-coated mirror 263 and the second double-coated mirror 264 may include a first coating reflecting light in an ultraviolet range of 405 nm and a second coating reflecting light in a near-infrared range of 810 nm, thereby being able to reflect light in both of the ultraviolet wavelength range and the near-infrared wavelength range. The first double-coated mirror 263 and the second double-coated mirror 264 may be disposed so as to reflect the beams of the two paths such that the beams (broadband pump laser beams) of the two paths separated at a ratio of 50:50 by the interferometer polarization beam splitter 261 travel in opposite directions and face each other. At this time, the interferometer half-wave plate 262 may be positioned between the interferometer polarization beam splitter 261 and the first double-coated mirror 263. In addition, the nonlinear crystal 240 may be positioned between the first double-coated mirror 263 and the second double-coated mirror 264 at a portion where the beams of the two paths face each other in opposite directions. The first lens 231 may focus the beams of the two paths at the center of the nonlinear crystal 240 positioned within the Sagnac interferometer 260. The broadband pump laser beams traveling in opposite directions may interact with the nonlinear crystal 240 to generate the multi-wavelength de-multiplexed entangled photon pair traveling to both sides (opposite directions) of the nonlinear crystal 240. The multi-wavelength de-multiplexed entangled photon pair traveling to both sides of the nonlinear crystal 240 is respectively reflected by the first double-coated mirror 263 and the second double-coated mirror 264, and then combined by the interferometer polarization beam splitter 261 and transmitted through the first dichroic mirror 271 to travel. Since the two paths only have different directions and the beam paths are completely coincident with each other in the Sagnac interferometer 260, there is no relative phase difference between the two beam paths, and thus, very stable multi-wavelength de-multiplexed entangled photon pair may be generated.

The second lens 232 may adjust a beam width such that the multi-wavelength de-multiplexed entangled photon pair that is combined by the interferometer polarization beam splitter 261 and transmitted through the first dichroic mirror 271 may travel as a straight beam without spreading out.

The second dichroic mirror 272 is configured to reflect light in the ultraviolet range of 405 nm and transmit light in the near-infrared range of 810 nm, so that the multi-wavelength de-multiplexed entangled photon pair passing through the second lens 232 may be transmitted. The second dichroic mirror 272 may filter out the broadband pump laser beam.

The third dichroic mirror 273 is configured to transmit a first polarization beam of the near-infrared range of 810 nm and reflect a second polarization beam, so that the multi-wavelength de-multiplexed entangled photon pair transmitted through the second dichroic mirror 272 may be split into a signal and an idler, thereby generating a multi-wavelength de-multiplexed polarization-entangled photon pair.

Figure 13:
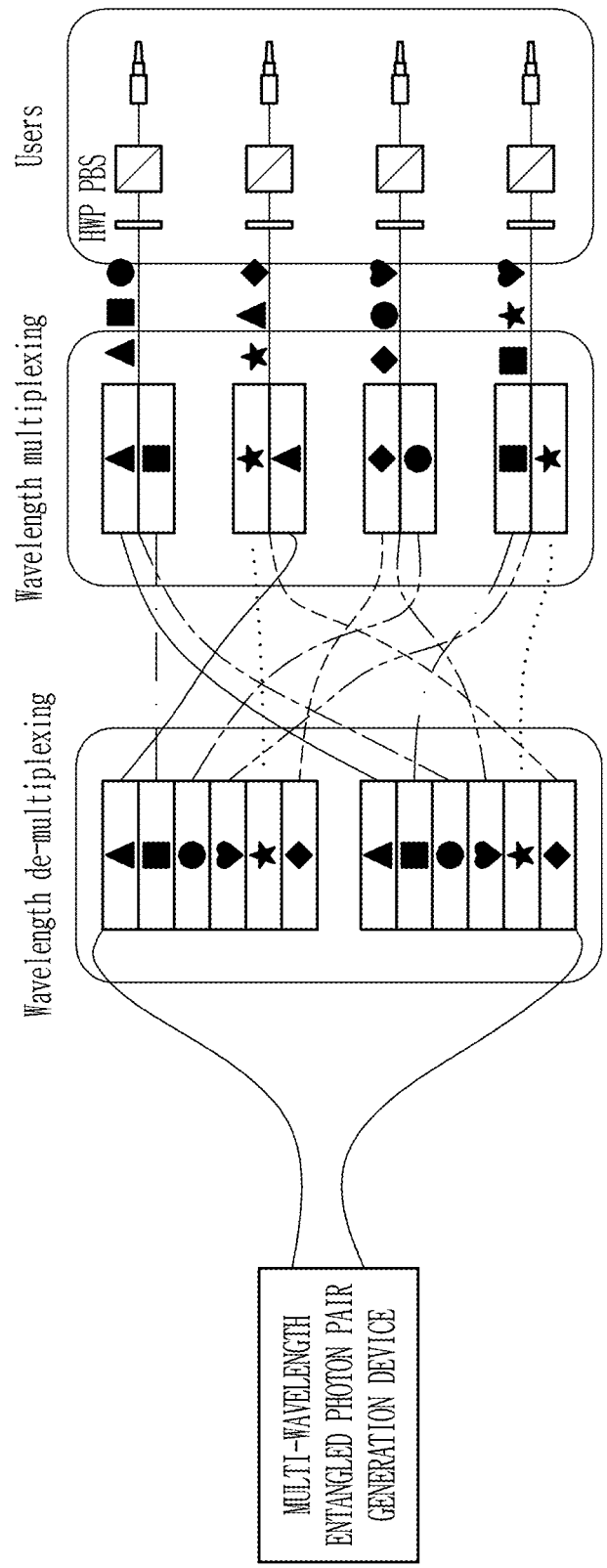
FIG. 13 is a schematic diagram illustrating a quantum key distribution network using the multi-mode pump laser based multi-wavelength entangled photon pair generation device according to the embodiment of the present disclosure.
Figure 14:
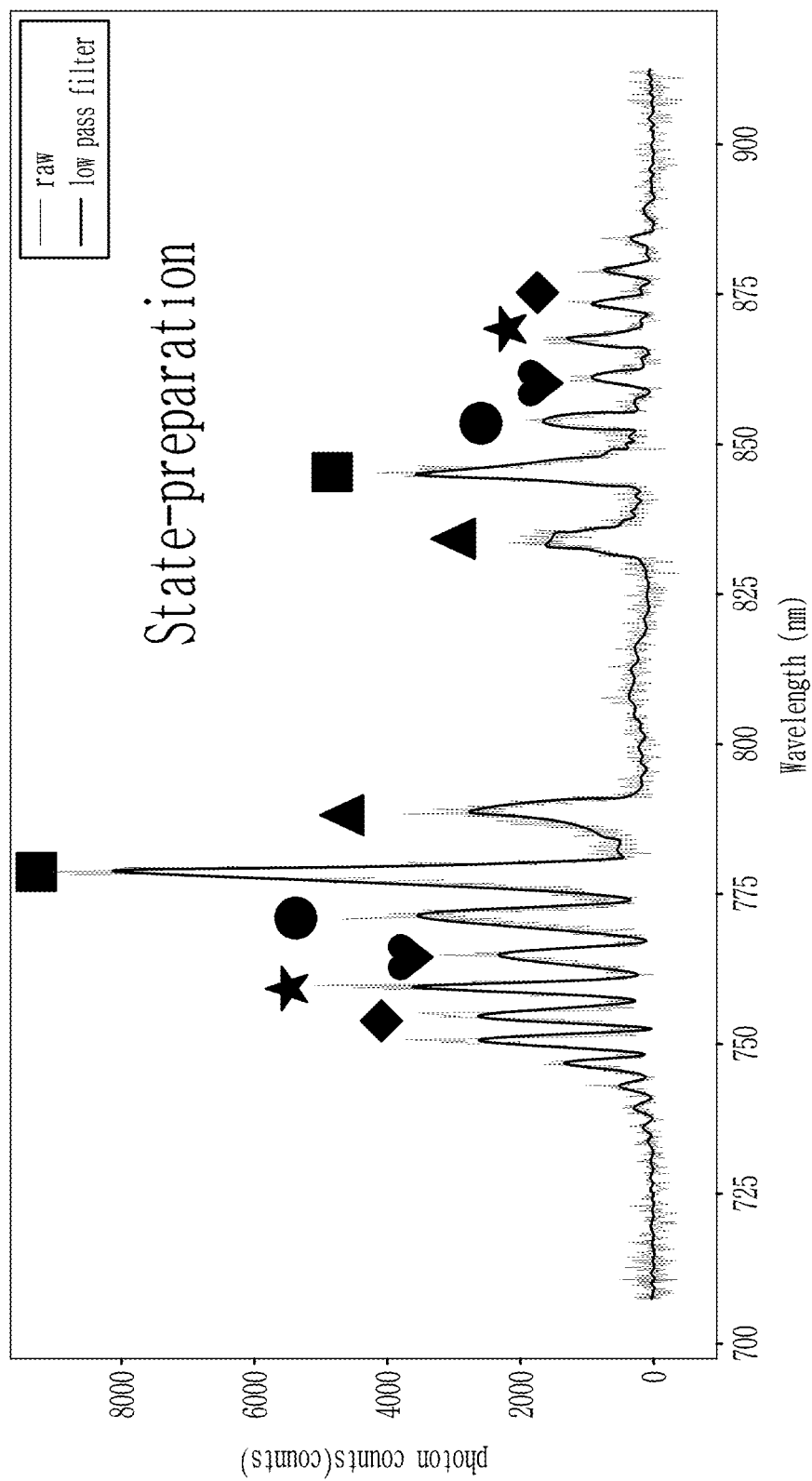
FIG. 14 illustrates an example in which six entangled photon pairs having wavelength correlations are generated in a polarization-entangled state by the multi-mode pump laser based multi-wavelength entangled photon pair generation device according to the embodiment of the present disclosure.

FIG. 13 is a schematic diagram illustrating a quantum key distribution network using the multi-mode pump laser based multi-wavelength entangled photon pair generation device according to the embodiment of the present disclosure. FIG. 14 illustrates an example in which six entangled photon pairs having wavelength correlations are generated in a polarization-entangled state by the multi-mode pump laser based multi-wavelength entangled photon pair generation device according to the embodiment of the present disclosure.

Referring to FIGS. 13 and 14, the quantum key distribution network performing multi-party quantum key distribution may be configured using the multi-wavelength entangled photon pair generation device 100 or 200 according to the embodiment of the present disclosure. As illustrated in FIG. 14, the multi-wavelength entangled photon pair generation device 100 or 200 may generate six multi-wavelength de-multiplexed polarization-entangled photon pairs having wavelength correlations in a state-preparation step. Then, in a wavelength de-multiplexing step, the multi-wavelength entangled photon pair generation device 100 or 200 may split the multi-wavelength de-multiplexed polarization-entangled photon pairs into 12 channels by splitting each of the six pairs for each wavelength using an optical filter. Then, in a wavelength multiplexing step, the multi-wavelength entangled photon pair generation device 100 or 200 may multiplex three channels to be distributed to four users, and each user may receive the photons subjected to wavelength de-multiplexing into three using a wavelength-specific filter and mirror through a single-mode optical fiber. As a result, each user may perform basis measurement using the half-wave plate and the polarization beam splitter from two photons entering the channel, obtain polarization information, and perform quantum key distribution, and the remaining photons may connect the users by using the wavelength correlation, so that four users may configure the quantum key distribution network using a wavelength de-multiplexing technique.

The accompanying drawings and the detailed description have not been used in order to limit the meaning or limit the scope of the present disclosure stated in the claims, but have been used only in order to illustrate the present disclosure. Therefore, a person of an ordinary skill in the art will appreciate that various modifications thereof and equivalent embodiments may be made. Therefore, an actual technical protection scope of the present disclosure is to be defined by the technical idea of the claims.

What is claimed is:

1. A multi-wavelength entangled photon pair generation device comprising: a multi-mode pump laser that radiates a broadband pump laser beam in an ultraviolet wavelength range including multiple Gaussian-distributed wavelengths;
   a nonlinear crystal that generates a multi-wavelength de-multiplexed entangled photon pair in a near-infrared wavelength range including multiple wavelength components corresponding to multiple Gaussian-distributed wavelengths of the broadband pump laser beam, respectively;
   a temperature controller that adjusts a temperature of the nonlinear crystal; and
   a Sagnac interferometer that separates the broadband pump laser beam into two paths such that beams of the two paths are incident on both sides of the nonlinear crystal while facing each other to generate the multi-wavelength de-multiplexed entangled photon pair traveling in opposite directions,
   wherein the Sagnac interferometer includes:
   an interferometer polarization beam splitter that splits the broadband pump laser beam into two paths at a ratio of 50:50;
   a first double-coated mirror and a second double-coated mirror disposed so as to reflect the beams of the two paths such that the beams of the two paths separated by the interferometer polarization beam splitter travel in opposite directions and face each other; and
   an interferometer half-wave plate positioned between the interferometer polarization beam splitter and the first double-coated mirror.

2. The multi-wavelength entangled photon pair generation device of claim 1, wherein
   the nonlinear crystal is positioned between the first double-coated mirror and the second double-coated mirror at a portion where the beams of the two paths face each other in opposite directions.

3. The multi-wavelength entangled photon pair generation device of claim 2, wherein
   the first double-coated mirror and the second double-coated mirror include a first coating reflecting light in an ultraviolet range and a second coating reflecting light in a near-infrared range to reflect light in both of the ultraviolet range and the near-infrared range.

4. The multi-wavelength entangled photon pair generation device of claim 3, wherein
   the multi-wavelength de-multiplexed entangled photon pair traveling to both sides of the nonlinear crystal is respectively reflected by the first double-coated mirror and the second double-coated mirror, and then combined by the interferometer polarization beam splitter to travel.

5. The multi-wavelength entangled photon pair generation device of claim 4, further comprising:
   a first lens that focuses the beams of the two paths at a center of the nonlinear crystal positioned within the Sagnac interferometer; and
   a second lens that adjusts a beam width such that the multi-wavelength de-multiplexed entangled photon pair that is combined by the interferometer polarization beam splitter and travels does not spread out and travels as a straight beam.

6. The multi-wavelength entangled photon pair generation device of claim 5, further comprising:
   a first dichroic mirror that reflects the broadband pump laser beam passing through the first lens to the Sagnac interferometer; and a second dichroic mirror that transmits the multi-wavelength de-multiplexed entangled photon pair passing through the second lens and reflects light in the ultraviolet range.

7. The multi-wavelength entangled photon pair generation device of claim 6, further comprising:
a third dichroic mirror that is configured to split the multi-wavelength de-multiplexed entangled photon pair transmitted through the second dichroic mirror into a signal and an idler.

8. A quantum key distribution network configuration method using a multi-wavelength entangled photon pair generation device, the quantum key distribution network configuration method comprising:
irradiating, by the multi-wavelength entangled photon pair generation device, a nonlinear crystal with a broadband pump laser beam in an ultraviolet wavelength range including multiple Gaussian-distributed wavelengths to generate a multi-wavelength de-multiplexed polarization-entangled photon pair in a near-infrared wavelength range including multiple wavelength components corresponding to the multiple Gaussian-distributed wavelengths of the broadband pump laser beam, respectively;
splitting, by the multi-wavelength entangled photon pair generation device, the multi-wavelength de-multiplexed polarization-entangled photon pair for each wavelength into a plurality of channels; and
multiplexing, by the multi-wavelength entangled photon pair generation device, channels to be distributed to a plurality of users.

9. The quantum key distribution network configuration method of claim 8, wherein
the multi-wavelength entangled photon pair generation device changes a temperature of the nonlinear crystal to generate the multi-wavelength de-multiplexed polarization-entangled photon pair in the near-infrared wavelength range that satisfies a temperature-specific phase matching condition for each of multiple wavelength components of the broadband pump laser beam.

* * * * *